United States Patent
Dumont et al.

(10) Patent No.: US 8,811,690 B2
(45) Date of Patent: Aug. 19, 2014

(54) IMAGING DEVICE HAVING A PRISMATIC ELEMENT

(75) Inventors: Denis Dumont, Paris (FR); Johnatan Monne, Paris (FR)

(73) Assignee: Morpho, Paris (FR)

( * ) Notice: Subject to any disclaimer, the term of this patent is extended or adjusted under 35 U.S.C. 154(b) by 132 days.

(21) Appl. No.: 13/377,424

(22) PCT Filed: Jun. 11, 2010

(86) PCT No.: PCT/FR2010/051174
§ 371 (c)(1),
(2), (4) Date: Dec. 9, 2011

(87) PCT Pub. No.: WO2010/146290
PCT Pub. Date: Dec. 23, 2010

(65) Prior Publication Data
US 2012/0087555 A1    Apr. 12, 2012

(30) Foreign Application Priority Data

Jun. 16, 2009  (FR) .................................. 09 54027

(51) Int. Cl.
*G06K 9/00* (2006.01)

(52) U.S. Cl.
CPC .................................... *G06K 9/00* (2013.01)
USPC ............ 382/127; 382/108; 382/124; 356/71; 356/726

(58) Field of Classification Search
CPC ...... G02B 6/32; G02B 6/0068; B60S 1/0885; B60S 1/0822; H05K 1/0274; G02F 1/157; H04N 5/2253; G06K 2009/00932
See application file for complete search history.

(56) References Cited

U.S. PATENT DOCUMENTS

| | | | | |
|---|---|---|---|---|
| 3,807,842 A | * | 4/1974 | Baker | ........................ 352/78 R |
| 4,783,167 A | * | 11/1988 | Schiller et al. | .................. 356/71 |
| 4,924,085 A | * | 5/1990 | Kato et al. | ............... 250/227.28 |
| 5,596,454 A | * | 1/1997 | Hebert | .......................... 359/726 |
| 5,986,746 A | * | 11/1999 | Metz et al. | ...................... 356/71 |

(Continued)

FOREIGN PATENT DOCUMENTS

| CN | 1234126 A | 11/1999 |
|---|---|---|
| CN | 101647029 A | 2/2010 |

(Continued)

OTHER PUBLICATIONS

Chinese Search Report for CN Appl. No. 2010800370206 mailed May 2, 2013 (1 page).
French Search Report and Written Opinion for PCT/FR2010/051174 mailed Nov. 29, 2010 (8 pages).

*Primary Examiner* — Vu Le
*Assistant Examiner* — Aklilu Woldemariam
(74) *Attorney, Agent, or Firm* — Gardere Wynne Sewell LLP; Andre M. Szuwalski (57) ABSTRACT

An imaging device includes a transparent prismatic element having two contiguous inlet surfaces separated by a ridge. A lens and an image sensor make it possible to acquire images, each including a reproduction of a first pattern located against one of the inlet surfaces, and a reproduction of a second imaged pattern through the other inlet surface. Such a device can be used in a biometric detection apparatus for detecting both a skin print and the vein distribution of a user. The device can also be used in a reading terminal capable of detecting a skin print and a machine-readable tape.

16 Claims, 3 Drawing Sheets

(ART ANTERIEUR)

(56) References Cited

U.S. PATENT DOCUMENTS

| | | |
|---|---|---|
| 6,292,576 B1 | 9/2001 | Brownlee |
| 7,889,893 B2 * | 2/2011 | Saliba et al. .................. 382/127 |
| 2004/0252867 A1 * | 12/2004 | Lan et al. ...................... 382/124 |
| 2008/0152196 A1 * | 6/2008 | Saliba et al. .................. 382/115 |
| 2008/0212840 A1 * | 9/2008 | Shalom et al. ................ 382/108 |
| 2009/0123038 A1 * | 5/2009 | Tissot et al. .................. 382/124 |
| 2010/0110170 A1 * | 5/2010 | Bringer et al. .................. 348/77 |

FOREIGN PATENT DOCUMENTS

| | | |
|---|---|---|
| WO | WO-9524692 A1 | 9/1995 |
| WO | WO-9613742 A1 | 5/1996 |
| WO | WO-0215566 A1 | 2/2002 |
| WO | WO-2004021278 A1 | 3/2004 |

* cited by examiner

FIG.1.
(ART ANTERIEUR)

IMAGING DEVICE HAVING A PRISMATIC ELEMENT

PRIORITY CLAIM

This application is a 371 filing from PCT/FR2010/051174 (published as WO 2010/146290) filed Jun. 11, 2010 which claims the benefit of French Application for Patent No. 09-54027 filed Jun. 16, 2009, the disclosures of which are hereby incorporated by reference.

TECHNICAL FIELD

The invention relates to an imaging device having a prismatic element, as well as to a skin pattern detection apparatus and a reading terminal which each incorporate such an imaging device.

BACKGROUND

Many imaging devices incorporate a prismatic element which is traversed by light that is used to form the image produced by the device. Magnifying binoculars and skin pattern detection devices are examples of such types of devices.

Figure 1:
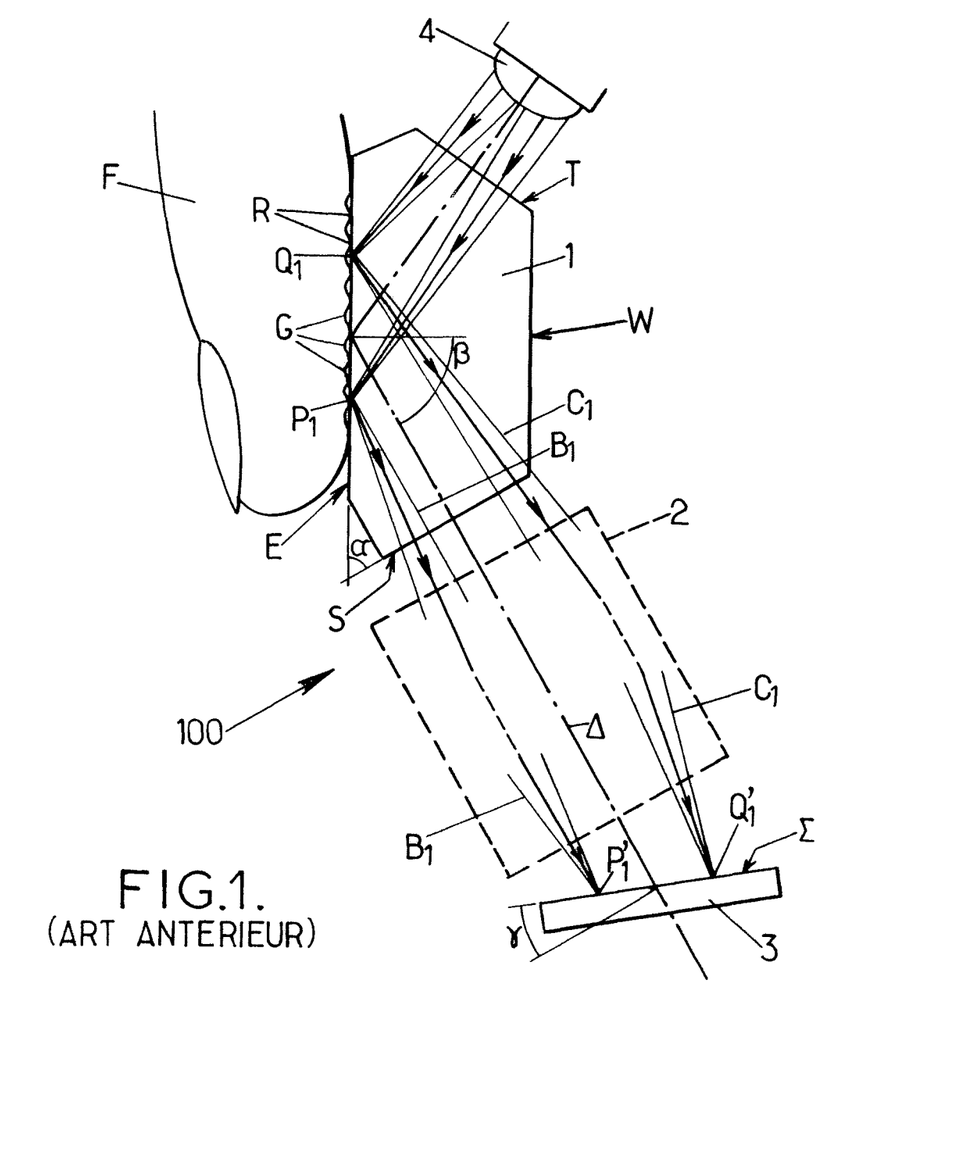
FIG. 1, already described, is a cross-sectional view of a fingerprint detection device known prior to the present invention.

In particular, a prior art skin pattern detection device is represented in FIG. 1. The device, denoted with the reference 100, comprises a prism of transparent material 1, an objective 2, and an image sensor 3. These elements are arranged so that when the device is used, the sensor 3 captures an image formed by the objective 2 from light rays which have passed through the prism 1. The prism 1 generally consists of a homogeneous material, such as polymethyl methacrylate (PMMA) or glass for example. It has an entrance face E which is flat and an exit face S which is also flat or which can be considered to be flat in a first explanation of the operation of the device. The entrance face E and exit face S together form an angle α, it being understood that the faces E and S are not necessary adjacent in the prism 1. In other words, the prism 1 does not necessarily have a single edge between the faces E and S, as there can be an intermediate face between the faces E and S. In this case, the angle α of the prism 1 appears between planes that extend the faces E and S. The objective 2 can be of any type, with three or four lenses for example, and the sensor 3 comprises a photosensitive surface Σ which is formed by a matrix of photodetectors.

The image sensor 3 is arranged so that the objective 2 optically conjugates the entrance face E of the prism 1 with the photosensitive surface Σ of the sensor. To do this, the surface Σ is generally sloped by an angle γ relative to a plane which is perpendicular to an optical axis Δ of the objective 2. In this manner, each point of the surface Σ is the image of a point of the entrance face E. FIG. 1 shows beams of light $B_1$ and $C_1$ forming different image points $P_1'$ and $Q_1'$ on the surface Σ, which are respectively conjugate with two distinct points $P_1$ and $Q_1$ of the entrance face E. In other words, the objective 2 produces on the surface Σ a clear image of a pattern located on the entrance face E.

When a user of the skin pattern detection device of FIG. 1 places the tip of one of his fingers F on the entrance face E, an image of his fingerprint is produced on the surface Σ of the sensor 3 and is captured. The skin surface of the finger F has a pattern of alternating ridges R and grooves G. When the user places his finger F on the face E, the peaks of the ridges R are in contact with the entrance face E and the grooves G are receded relative to this face so that an air gap separates them from it.

The light used to form the image of the fingerprint captured by the sensor 3, usually visible or infrared light, can be introduced by several methods which are also known.

In a first such method, it can be introduced into the finger F through the skin in the vicinity of the fingertip applied to the face E. The light then propagates inside the finger F and exits at the ridges R in contact with the material of the prism 1 on the entrance face E.

In a second light introduction method, represented in FIG. 1, a light source 4 illuminates the face E of the prism 1, through a supplemental face T of the prism 1. The supplemental face T is positioned so that a ray produced by the source 4 and entering the prism 1 by this face T, in the direction of the face E, is reflected inside the prism 1 and exits through the face S in the direction of the objective 2. In addition, the faces E and S of the prism 1 and the optical axis Δ of the objective 2 are oriented so that the internal reflection of the ray on the face E is total when a skin groove G is present at the point of this reflection, and is partial when a skin ridge R is in contact with the face E at the point of reflection. To achieve this, and when the prism 1 is of PMMA, the optical axis Δ of the objective 2 forms an angle β which can be approximately 48° with a direction perpendicular to the face E. For a PMMA/air interface, the critical angle is about 42°. For such a second lighting method, the grooves G appear bright in the image captured by the sensor 3 while the ridges R appear dark. Such a second lighting method corresponds to shadowgraph imaging conditions.

In a third method, the light can be introduced into the prism 1 through yet another face of the prism 1 which is opposite the face E and is denoted W. Preferably, this light can be diffuse. Under these conditions, the grooves G of the fingerprint appear dark in the image captured by the sensor 3, while the ridges R appear light. This third lighting method is a direct lighting method. When there is a supplemental face T of the prismatic element 1, enabling total reflection on the face E, an absorbent screen can be placed opposite the supplemental face T, or the supplemental face T can itself be made to be absorbent.

Lastly, it is also known to give a curved shape to the exit face S of the prism 1, for example a spherical shape, so that this face has additional optical power which combines with that of the objective 2.

Such an imaging device as illustrated in FIG. 1 is limited to the detection of a skin pattern, and is not designed to provide supplemental information. When such supplemental information is desired, an additional imaging device must usually be coupled with the one in the figure to produce an additional image containing the supplemental information. The complexity of the resulting imaging assembly, its bulk, and its cost are then much greater than those of the device in FIG. 1.

Patent WO 96/13742 (the disclosure of which is hereby incorporated by reference) describes, particularly in relation to FIG. 13 of said patent, an imaging device which simultaneously captures an image of a fingerprint of a finger applied to a surface, and of a barcode presented to an entrance face of a prismatic element. Because the face where the finger is applied and the entrance face of the prismatic element form a re-entrant angle, the captured image is not sharp for either the fingerprint or the barcode.

SUMMARY

One aim of the invention is therefore to propose an imaging device which allows simultaneously capturing two separate images containing different information, and which is simple in design.

Another aim is to propose such an imaging device which is small in size and is not significantly higher in cost than prior art devices.

Yet another aim is to propose an imaging device capable of providing images which each reproduce a skin pattern and a supplemental pattern at the same time, with both the skin pattern and the supplemental pattern being simultaneously sharp.

To achieve this, an imaging device of the invention also comprises a transparent prismatic element, an objective, and an image sensor, which are arranged so that the sensor captures an image formed by the objective from rays which have passed though the prismatic element.

In a first characteristic of the invention, the prismatic element comprises two contiguous entrance faces which are angled relative to each other and separated by an edge, and an exit face. These two entrance faces and the exit face are arranged so that the image captured by the sensor comprises both a first image part formed from first rays coming from a first of the two entrance faces of the prismatic element and having passed through its exit face, and a second image part formed from second rays having passed through a second of the entrance faces of the prismatic element, different from the first entrance face, and its exit face. To do this, the objective is arranged so that the first entrance face of the prismatic element is conjugate with a first part of the photosensitive surface of the image sensor, such that the first image part reproduces a first pattern positioned against the first entrance face.

Thus, the input optical field of an imaging device of the invention consists, of two separate field portions, one being a portion of the first entrance face of the prismatic element. This portion of the first entrance face of the prismatic element is optically conjugate with the first part of the photosensitive surface of the image sensor. The other portion of the input field, which is located outside the first entrance face, is optically conjugate, through the second entrance face of the prismatic element, with a second part of the photosensitive surface of the sensor which is different from the first portion of this photosensitive surface. In this manner, each complete image captured by the sensor contains information originating from a pattern positioned on the first entrance face of the prismatic element, and supplemental information originating from the second portion of the input field of the device.

In addition, an imaging device of the invention uses a single objective and a single image sensor to produce the two image parts which correspond to the two separate portions of the input field. For this reason, the size and cost of the device are not substantially increased in comparison to known prior art devices.

In addition, given that the two entrance faces of the prismatic element are contiguous and that the first portion of the input field, corresponding to the first image part, coincides with the first entrance face, the two image parts are also contiguous on the photosensitive surface of the image sensor. All of this photosensitive surface is therefore useful during each image capture, with no unused strip between the two image parts.

In a second characteristic of the invention, the angle between the two entrance faces of the prismatic element is adapted so that the rays forming the second image part do not undergo total reflection within the prismatic element on the second entrance face, at a location where the latter is in contact with air. In this manner the second image part reproduces, through the prismatic element between its second entrance face and its exit face, a pattern positioned in front of the second entrance face outside the prismatic element.

In a third characteristic of the invention, the angle between the two entrance faces of the prismatic element is salient, so that a portion of a geometric plane, which is optically conjugate with the photosensitive surface of the image sensor in the second image part, is positioned outside the prismatic element. In this manner, a second pattern can be placed in this geometric plane and the second image part is a sharp reproduction of this second pattern. In addition, the second image part can have a high contrast.

Lastly, the geometric plane which has a portion conjugate to the surface of the sensor in the second image part, also passes through the edge separating the two entrance faces. The continuity which thus exists between the first entrance face and the geometric plane of which a portion is imaged in the second image part, allows this second image part to be sharp at the same time as the first image part which reproduces a first pattern positioned on the first entrance face. Thus, the dual function of the device which consists of imaging two patterns at the same time, on the first entrance face and through the second entrance face of the prismatic element respectively, is satisfied.

The invention also proposes a skin pattern detection apparatus comprising an imaging device as described above. Such an apparatus is arranged so that when a user places a first skin surface portion against the first entrance face of the prismatic element, the first image part captured by the image sensor reproduces a skin pattern for the first skin surface portion. The second image part simultaneously reproduces a vein distribution pattern located under a second skin surface portion in the vicinity of the first skin surface portion.

As a result, such a detection apparatus simultaneously provides information on the user's skin pattern and vein distribution. It is therefore suitable for biometric recognition of the user based on these two pieces of information.

In this case, the skin surface applied against the first entrance face can be illuminated through the organic tissue surrounding this skin surface, or by shadowgraphy, or by direct lighting through another face of the prismatic element. The vein distribution pattern can be simultaneously illuminated by transmission through the organic tissue surrounding the vein distribution.

The invention also proposes a reading terminal comprising an imaging device as described above, and arranged so that when a user of this terminal places a skin surface portion against the first entrance face of the prismatic element, the first image part reproduces a skin pattern for this skin surface portion, and so that when a machine-readable strip is presented to the second entrance face, the second image portion reproduces at least a segment of this machine-readable strip.

The skin surface applied against the first entrance face can again be illuminated using the three lighting methods described above for the skin pattern detection and vein distribution application. The readable strip can be illuminated by emitting light through this strip when it is sufficiently transparent, or through the prismatic element.

BRIEF DESCRIPTION OF THE DRAWINGS

Other features and advantages of the invention will become apparent from reading the following description of some non-limiting embodiments with reference to the attached drawings, in which.

For clarity, the dimensions of the elements represented in these figures are not proportional to the actual dimensions or dimension ratios. In addition, identical references in the figures denote the same elements or elements with identical functions.

DETAILED DESCRIPTION OF THE DRAWINGS

Figure 2:
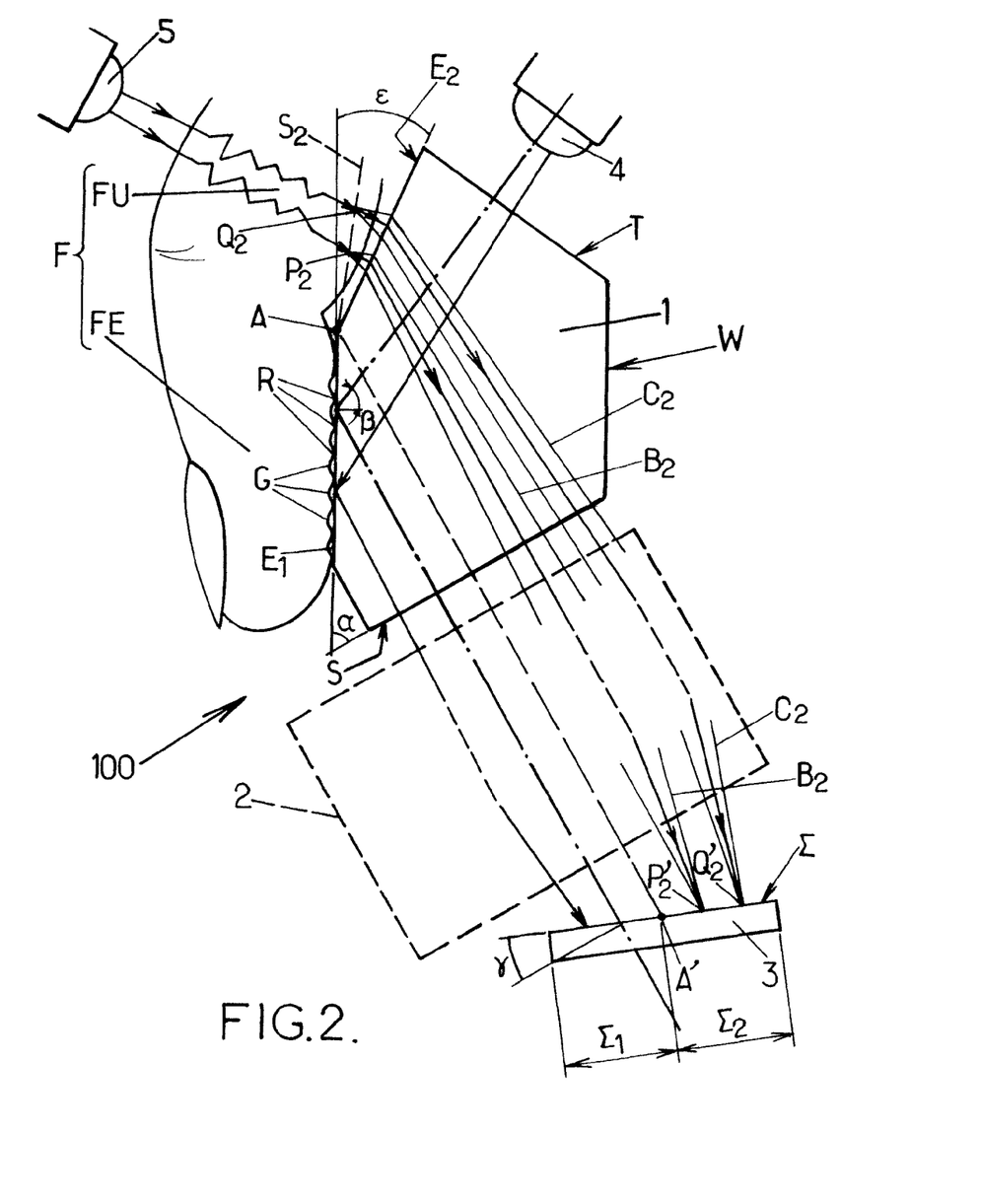
FIGS. 2 and 3 are cross-sectional views of two fingerprint detection devices of the invention.
Figure 3:
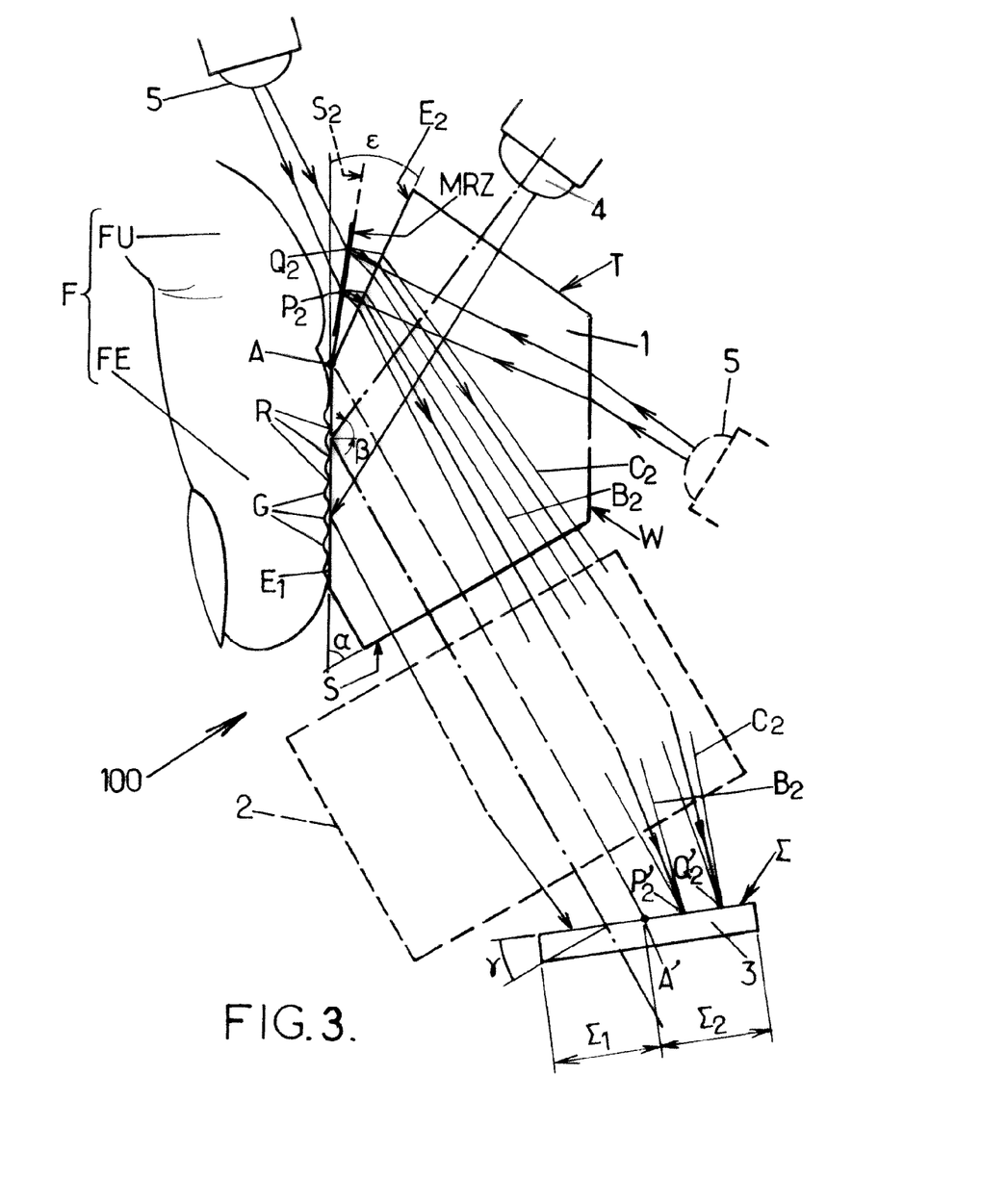

In FIGS. 2 and 3, an imaging device 100 of the invention comprises a prismatic element 1 with two entrance faces and one exit face. The two entrance faces, which are referred to as the first and second entrance faces and are respectively denoted $E_1$ and $E_2$, are flat and together form a salient angle $\epsilon$. The sides are separated by a rectilinear edge A which is perpendicular to the plane of the figure. The other elements of the device are analogous to those described for FIG. 1, and it is unnecessary to repeat their description here. The image sensor 3 is positioned so that the image A' of the edge A, which is produced through the exit face S by the objective 2, divides the photosensitive surface $\Sigma$ into two contiguous parts.

The optical operation of the device, for a first pattern positioned on the entrance face $E_1$ of the prismatic element 1, is identical to the operation described for FIG. 1. The entrance face $E_1$ can again be illuminated in one of the three following ways:

through the entrance face $E_1$, by transmission inside the finger F;

by shadowgraphy: for this, the first entrance face $E_1$, the exit face S, and the image sensor 3, must be arranged so that the internal reflection within the prismatic element 1 of a ray coming from the first entrance face $E_1$ and reaching the photosensitive surface $\Sigma$ of the image sensor 3 is total on this first entrance face at a location where it is in contact with air, or is partial on the same first entrance face at another location where it is in contact with a skin ridge. The totality or partiality of the reflection characterizes the fraction of the radiation intensity which is reflected relative to the intensity of the incident radiation on the first entrance face. It is equal to 100% or is less than 100% depending on whether the reflection is total or partial. This variation in the nature of the reflection provides, in the first image part, a significant contrast between the areas of the first entrance face which are in contact with the air and other areas of this face which are in contact with a skin ridge. The lighting system 4 is then arranged to emit rays which enter the prismatic element 1 by its supplemental face T, in a manner that illuminates the first pattern positioned against the first entrance face $E_1$. Image points in the first image part $\Sigma_1$, which correspond to points of the entrance face $E_1$ where the material of the prismatic element 1 is in contact with the air, then appear brighter than other image points in the image part $\Sigma_1$ which correspond to points of the entrance face $E_1$ where the material of the prismatic element 1 is in contact with an outside body. The rays produced by the lighting system 4 which reach the entrance face $E_1$ where there is a skin groove G are totally reflected in the direction of the exit face S, and those which reach the entrance face $E_1$ where there is a skin ridge R partially exit the prismatic element through this face $E_1$;

by direct lighting: the system for illuminating the first pattern, meaning the pattern which is imaged by the objective 2 in the first image part $\Sigma_1$, is on a side of the prismatic element 1 opposite the first entrance face $E_1$, in order to illuminate the first pattern positioned against this entrance face $E_1$, through the prismatic element 1. For example, such a lighting system, which preferably produces a diffuse illumination, can be directed towards the inside of the prismatic element 1 through the face W. The first image part $\Sigma_1$ then has a reverse contrast compared to that obtained with the shadowgraphy lighting method, in which the imaged point of the entrance face $E_1$ is or is not in contact with an outside body. When there is a supplemental face T, an absorbing mask is advantageously placed on it, and the system for illuminating the first pattern lights it from at least one direction which passes outside the mask. The mask absorbs any rays coming from the supplemental face T which would propagate inside the prismatic element 1, increasing the contrast of the first image part $\Sigma_1$.

It is understood that the arrangement of the first entrance face $E_1$, the exit face S, and the image sensor 3, which is required for the shadowgraphy lighting method, can be satisfied even if another type of lighting is used for the first pattern positioned against the entrance face $E_1$.

The photosensitive surface $\Sigma$ of the image sensor 3 may be sloped relative to the plane which is perpendicular to the optical axis $\Delta$ of the objective 2. Thus the entrance face $E_1$ can be optically conjugate with the photosensitive surface $\Sigma$ in the image part $\Sigma_1$.

The image part which is denoted $\Sigma_2$ is formed by rays coming from the side of the edge A opposite the entrance face $E_1$. However, the angle $\epsilon$ is such that the rays forming the image part $\Sigma_2$ are not totally reflected on the entrance face $E_2$ inside the prismatic element 1, when the entrance face $E_2$ is only in contact with the air. In other words, the image part $\Sigma_2$ is formed by rays which have passed through the entrance face $E_2$ and which come from a second pattern positioned in front of this face, outside the prismatic element 1. To achieve this, the angle $\epsilon$ must be greater than Arcsin(1/n), where n is the refractive index for the material of the prismatic element 1. After the rays are refracted through the entrance face $E_2$ of the prismatic element 1, the image part $\Sigma_2$ is optically conjugate with a geometric plane called the supplemental object plane $S_2$, which passes through the edge A and extends above the entrance face $E_2$, outside the prismatic element 1. In this manner the second pattern which is positioned in the object plane $S_2$ is imaged in the image part $\Sigma_2$, through the prismatic element 1 and the objective 2. FIGS. 2 and 3 show two beams of light $B_2$ and $C_2$ respectively originating from points $P_2$ and $Q_2$ of the supplemental object plane $S_2$, and forming the image points $P_2'$ and $Q_2'$ in the image part $\Sigma_2$.

The supplemental object plane $S_2$ is positioned outside the prismatic element 1, such that the second pattern can be a physical pattern which forms a real object in optics terminology. The supplemental object plane $S_2$, which contains the second pattern, passes through the edge A. It therefore remains close to the entrance face $E_1$, at least in the vicinity of the edge A, such that the first and second pattern can be simultaneously clear in the complete image captured by the sensor 3, when the objective 2 is focused appropriately.

In addition, the angle between the entrance face $E_1$ and the supplemental object plane $S_2$ may be adjusted by selecting a value for the angle $\epsilon$ as a function of the value of the refractive index of the transparent material constituting the prismatic element 1. In particular, the entrance face $E_1$ and the supplemental object plane $S_2$ may be in the same geometric plane, one being positioned in an extension of the other with no change in slope. In other words, the refractive index n of the prismatic element 1 and the angle $\epsilon$ between the two entrance faces $E_1$ and $E_2$ may be adapted so that the second image part $\Sigma_2$ reproduces the second pattern when it is in a geometric plane which also contains the entrance face $E_1$. In this case, the first and second patterns can appear simultaneously sharp in the image captured by the sensor 3, even with a low depth of field. Such a configuration is obtained, for example, when the prismatic element 1 is of PMMA and the angle $\epsilon$ is approximately equal to 21° (degrees).

In a known manner, an image produced by a centered optical system such as the objective 2 can have an image quality which is greatest in the vicinity of its optical axis compared to portions of the image which are transversely further away. The image quality may be reduced by optical distortions caused by the centered system itself, which limit the resolution and the image quality. Such optical distortions increase away from the optical axis. It is then possible, in an imaging device of the invention, to offset the prismatic element 1 and the sensor 3, transverse to the optical axis $\Delta$ of the objective 2, so that this optical axis passes through the first image part $\Sigma_1$ at a distance from the second image part $\Sigma_2$. In this manner, the device can have a higher quality reproduction of the first pattern positioned against the entrance face $E_1$, than the reproduction of the second pattern positioned in the supplemental object plane $S_2$. Thus the first pattern can have a smaller pitch than the second pattern while both patterns remain legible in the image captured by the sensor 3.

Different lighting methods can be used to illuminate the second pattern to be imaged, depending on the imaging device application.

In a first method for illuminating the second pattern, the imaging device 100 may again comprise a second lighting system which emits rays entering the prismatic element 1 by the second entrance face $E_2$, through the portion of the geometric plane which is optically conjugate with the photosensitive surface $\Sigma$ of the image sensor 3 in the second image part $\Sigma_2$. The real object which forms the second pattern in the supplemental object plane $S_2$ is then illuminated by transmission through this object, if it is sufficiently transparent. The second illumination system used in this manner is denoted 5 in FIGS. 2 and 3, and is represented with solid lines.

In a second method for illuminating the second pattern, the second lighting system 5 emits rays which enter the prismatic element 1 by the face W, in a manner that illuminates, through the prismatic element 1 by this face W and by the entrance face $E_2$, the portion of the geometric plane which is optically conjugate with the photosensitive surface $\Sigma$ of the sensor 3 in the second image part $\Sigma_2$. In this case, the object which forms the second pattern can be opaque because it is illuminated from the same side as the objective 2. The second lighting system 5 used in this manner is represented with dotted lines in FIG. 3.

Depending on the lighting methods used to illuminate the entrance face $E_1$ and the second pattern, a common lighting system can be used.

An imaging device of the invention can be used for numerous applications, which are determined by the apparatus which incorporates it.

In particular, one such application is the detection of a user's fingerprint when the user places the end FE of one of his fingers F on the first entrance face $E_1$ of the prismatic element 1. The apparatus may then be arranged so that a proximal part FU of the finger is simultaneously placed above the second entrance face $E_2$ of the prismatic element 1. The supplemental object plane $S_2$ is then located inside the finger F, under its skin, in the proximal portion FU. The two image parts produced by the apparatus on the photosensitive surface $\Sigma$ at the same time and captured in one image, are:

the image part $\Sigma_1$, which reproduces the fingerprint pattern of the finger tip FE positioned on the entrance face $E_1$; and the image part $\Sigma_2$, which reproduces a vein distribution pattern for the proximal part FU of the finger located in the supplemental object plane $S_2$.

It is possible for the apparatus also to comprise a guidance and verification system to assist the user with positioning the fingertip FE and the proximal part FO of his finger F in an identical manner during successive uses of the apparatus. The image part $\Sigma_2$ then corresponds each time to the same depth under the skin of the vein distribution detection, and the pattern of this vein distribution can be used to conduct a second biometric recognition of the user in addition to the one based on the fingerprint.

For this fingerprint detection and vein distribution application, the vein distribution is illuminated using the first method for illuminating the second pattern which was described above. The vein distribution is illuminated by diffuse transmission through the finger F, as represented in FIG. 2. When the fingerprint is also illuminated by transmission through the finger, the lighting system for this fingerprint and for the vein distribution can be combined into a single system.

In another application of an imaging device of the invention, this device can be incorporated into a reading terminal which captures a fingerprint and reads an identity document which has a MRZ strip (Machine Readable Zone), such as a passport. The device 100 then allows capturing the fingerprint in image part $\Sigma_1$ and the MRZ code in image part $\Sigma_2$. To achieve this, the MRZ strip is placed in the supplemental object plane $S_2$. It is possible for the MRZ strip to advance within the supplemental object plane $S_2$ if the image part $\Sigma_2$ is not sufficiently large to capture the entire MRZ in a single exposure.

This other application, which is illustrated in FIG. 3, can also be compatible with the first lighting method which transmits light through the support for the MRZ, if the strip is sufficiently transparent. Otherwise, the MRZ can be illuminated using the second lighting method for illuminating the second pattern as described above. In this latter case, the fingerprint and the MRZ can be illuminated by the same lighting system, with direct illumination through the face W.

It is understood that the invention can be reproduced by adapting the embodiments detailed above while retaining at least some of the advantages that have been described. In particular, the lighting methods can be further modified according to the application, particularly in order to obtain higher contrast in one or both of the image parts. In addition, a person skilled in the art can modify the device using the general knowledge in the field of imaging, without any inventive activity beyond that of the present invention.

The invention claimed is:

1. Imaging device comprising a transparent prismatic element, an objective with an optical axis, and an image sensor, which are arranged so that the sensor captures an image formed by the objective from rays having passed through the prismatic element, wherein said prismatic element comprises two contiguous entrance faces, angled relative to each other and meeting at a rectilinear edge, and an exit face, said entrance faces and exit face being arranged so that the image captured by the sensor comprises both a first image part formed from first rays coming from a first of the entrance faces of the prismatic element and having passed through the exit face of said prismatic element, and a second image part formed from second rays having passed through a second of the entrance faces of the prismatic element, different from said first entrance face, and said exit face of the prismatic element, wherein the objective is arranged so that the first entrance face of the prismatic element is conjugate with a first part of a photosensitive surface of the image sensor, such that the first image part reproduces a first pattern positioned against said first entrance face of the prismatic element, wherein an angle between the two entrance faces of the prismatic element is adapted so that the rays forming the second image part do not undergo total reflection within the prismatic element on the second entrance face, at a location where said second entrance face is in contact with air, and said angle between the two entrance faces of the prismatic element being salient, so that a portion of a geometric plane, which is optically conjugate with the photosensitive surface of the image sensor in the second image part, is positioned outside the prismatic element, and said geometric plane passes through the edge separating the two entrance faces.

2. Imaging device according to claim 1, wherein a refractive index of the prismatic element and the angle between the first and the second entrance face of said prismatic element are such that the geometric plane, of which a portion is optically conjugate with the photosensitive surface of the image sensor in the second image part, contains the first entrance face of the prismatic element.

3. Imaging device according to claim 1, wherein the photosensitive surface of the image sensor is sloped relative to a plane perpendicular to the optical axis of the objective.

4. Imaging device according to claim 1, wherein the objective is arranged such that the optical axis of said objective passes through the first image part at a distance from the second image part.

5. Imaging device according to claim 1, wherein the first entrance face, the exit face, and the image sensor, are arranged so that the internal reflection within the prismatic element of a ray coming from said first entrance face and reaching the photosensitive surface of said image sensor is total on said first entrance face at a location where it is in contact with air, or is partial on said first entrance face at another location where it is in contact with a skin ridge, and wherein the prismatic element additionally comprises a supplemental face arranged relative to the first entrance face such that a ray propagating in the prismatic element from the supplemental face undergoes total reflection on said first entrance face.

6. Imaging device according to claim 5, additionally comprising:

a first lighting system which emits rays entering the prismatic element by the supplemental face of said prismatic element in a manner that illuminates the first pattern positioned against the first entrance face of the prismatic element; and a second lighting system which emits rays entering the prismatic element by the second entrance face through the portion of the geometric plane which is optically conjugate with the photosensitive surface of the image sensor in the second image part.

7. Imaging device according to claim 5, additionally comprising:

a first lighting system which emits rays entering the prismatic element by the supplemental face of said prismatic element in a manner that illuminates the first pattern positioned against the first entrance face of the prismatic element; and a second lighting system which emits rays entering the prismatic element by another face of said prismatic element opposite the first entrance face, in a manner that illuminates, through said prismatic element by said opposite face and the second entrance face, the portion of the geometric plane which is optically conjugate with the photosensitive surface of the image sensor in the second image part.

8. Imaging device according to claim 5, additionally comprising an absorbing mask placed on the supplemental face.

9. Imaging device according to claim 1, comprising a first lighting system arranged on a side of the prismatic element opposite the first entrance face, in order to illuminate the first pattern positioned against said first entrance face, through said prismatic element; and a second lighting system which emits rays entering the prismatic element by the second entrance face through the portion of the geometric plane which is optically conjugate with the photosensitive surface of the image sensor in the second image part.

10. Imaging device according to claim 1, comprising:

a first lighting system arranged on a side of the prismatic element opposite the first entrance face, in order to illuminate the first pattern positioned against said first entrance face, through said prismatic element; and a second lighting system which emits rays entering the prismatic element by a face of said prismatic element opposite the first entrance face, in a manner that illuminates, through said prismatic element by said opposite face and the second entrance face, the portion of the geometric plane which is optically conjugate with the photosensitive surface of the image sensor in the second image part.

11. Imaging device according to claim 10, wherein said first and second lighting systems are combined into a single lighting system, arranged to illuminate simultaneously the first pattern positioned against the first entrance face of the prismatic element and the portion of the geometric plane which is optically conjugate with the photosensitive surface of the image sensor in the second image part, by emitting rays entering the prismatic element through the face, opposite the first entrance face, of said prismatic element.

12. Imaging device according to claim 6 configured as a skin pattern detection apparatus and arranged so that when a user of said apparatus places a first skin surface portion against the first entrance face of the prismatic element, the first image part reproduces a skin pattern of said first skin surface portion, and the second image part simultaneously reproduces a vein distribution pattern located under a second skin surface portion in the vicinity of said first skin surface portion.

13. Imaging device apparatus according to claim 12, adapted so that the user places the tip of his finger against the first entrance face of the prismatic element, and simultaneously places a proximal part of said finger above the second entrance face of said prismatic element.

14. Imaging device according to claim 1, wherein the imaging device forms a reading terminal arranged so that when a user of said terminal places a skin surface portion against the first entrance face of the prismatic element, the first image part reproduces a skin pattern of said skin surface portion, and when a machine-readable zone is placed in front of the second entrance face, the second image part reproduces at least a segment of said machine-readable zone.

15. Imaging device according to claim 9 configured as a skin pattern detection apparatus and arranged so that when a user of said apparatus places a first skin surface portion against the first entrance face of the prismatic element, the first image part reproduces a skin pattern of said first skin surface portion, and the second image part simultaneously reproduces a vein distribution pattern located under a second skin surface portion in the vicinity of said first skin surface portion.

16. Imaging device according to claim 15, adapted so that the user places the tip of his finger against the first entrance face of the prismatic element, and simultaneously places a proximal part of said finger above the second entrance face of said prismatic element.

* * * * *